Mar. 13, 1923.
J. F. O'CONNOR.
FRICTION SHOCK ABSORBING MECHANISM.
FILED JAN. 14, 1921.
1,448,491
2 SHEETS—SHEET 2.
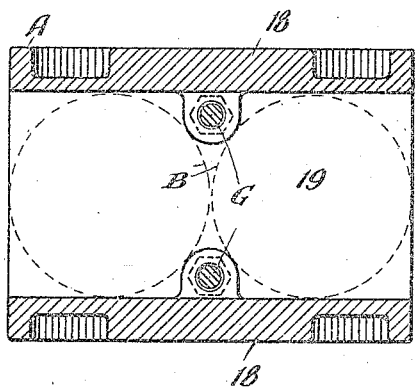
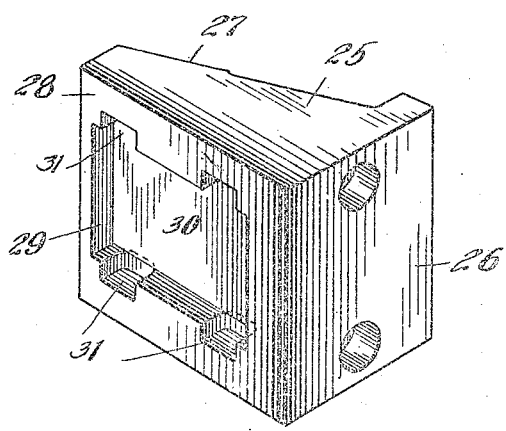
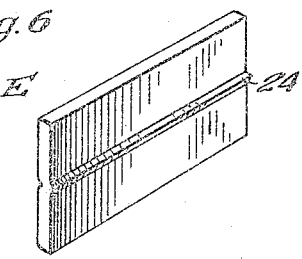
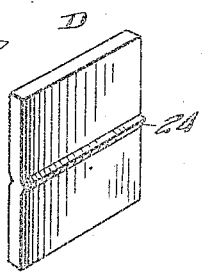
Witnesses:
Wm. Geiger
Inventor
John F. O'Connor
By Geo. I. Haight
His Atty.

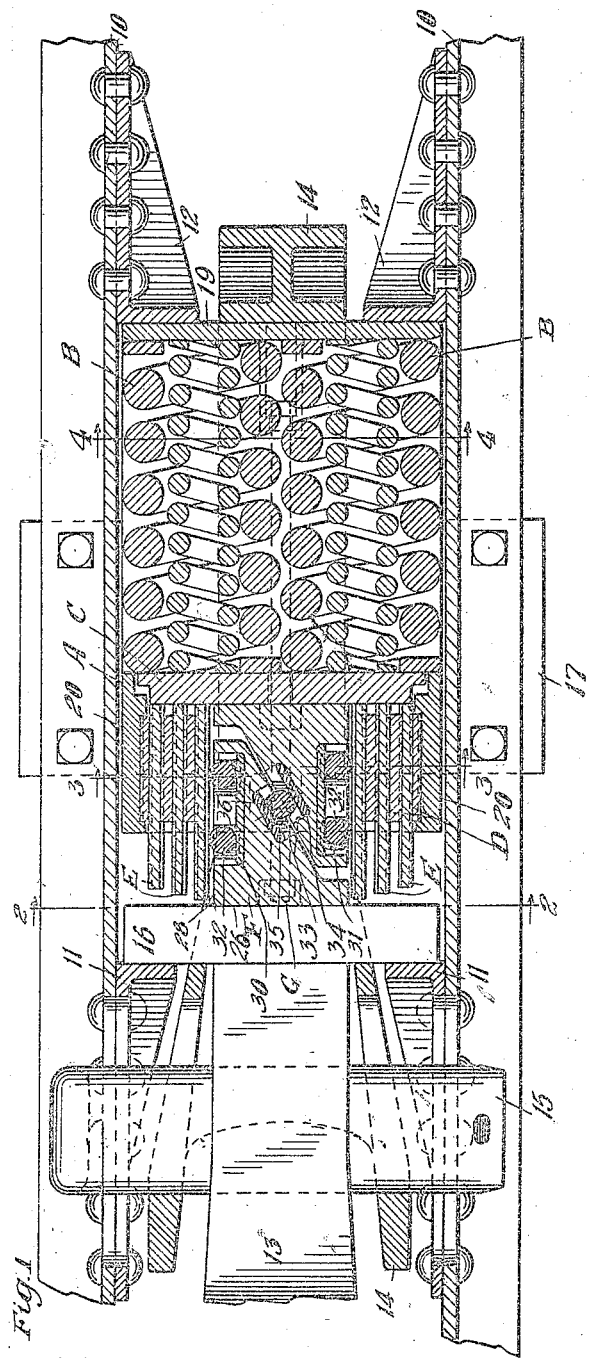

Patented Mar. 13, 1923.

1,448,491

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed January 14, 1921. Serial No. 437,259.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

An object of the invention is to provide a high capacity, graduated friction shock absorbing mechanism especially adapted for railway draft riggings and wherein are employed intercalated friction plates to thereby obtain unusually large frictional wearing areas without excessive pressure per unit of area, and means for insuring ready and certain release.

Other objects of the invention will more clearly appear from the description hereinafter following.

In the drawings forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. Figures 3 and 4 are vertical, transverse sectional views of the shock absorbing mechanism proper, corresponding substantially to the lines 3—3 and 4—4 respectively of Figure 1. Figure 5 is a perspective view of one of the elements employed in the wedge pressure-transmitting means. And Figures 6 and 7 are perspective views of one of the movable and one of the stationary friction plates, respectively.

In said drawings, 10—10 denote channel center or draft sills of a railway car, to the inner faces of which are secured front stop lugs 11 and rear stop lugs 12. A portion of a drawbar is indicated at 13 which is operatively connected to the shock absorbing mechanism proper by a hooded cast yoke 14 and coupler key 15. The shock absorbing mechanism proper, hereinafter described, and a front main follower 16 are disposed within the yoke. The yoke and the parts therewithin are adapted to be supported in operative position by a detachable saddle plate 17.

The improved shock absorbing mechanism proper, as shown, comprises, broadly, a combined spring cage and casting A; twin arranged springs B—B; a spring follower C; a plurality of relatively stationary friction plates D—D; a plurality of relatively movable friction plates E—E; a pressure-transmitting wedging device indicated generally by the reference character F; and a retainer bolt G.

The casting A is of generally rectangular form having upper and lower parallel walls 18—18, integral rear wall 19, and at the front thereof is provided with integral side walls 20—20. Said side walls 20 are relatively short lengthwise of the casting A so as to leave the latter open at its sides to thereby permit the insertion and removal of the twin arranged springs B—B, as best shown in Figures 1 and 4.

At the forward end of the casting A, the walls 18—18 and 20—20 form a casing or shell within which are received the friction plates and the wedging device F. As best shown in Figure 3, the interior of said casing is vertically extended at the center as shown at 21, the vertical dimension being less on either side thereof as indicated at 22. The casing is formed on either side of the center thereof with laterally extending guideways having overhanging end flanges 23—23 so as to accommodate the stationary friction plates D, the latter being held against movement lengthwise of the casting A but free to respond to lateral pressure exerted thereagainst from the wedging device F.

In the drawings I have shown three movable friction plates E on each side of the center of the mechanism, said plates E being alternated with the stationary plates D. The movable plates E are necessarily of lesser vertical height than the stationary plates D in order to pass between the flanges 23. It is desirable that the movable plates E be maintained always in the same relative vertical position and in such a way as to avoid having any edges thereof scrape along any parts of the casting A. To accomplish this result, the plates D and E are formed with longitudinal central offsets as indicated at 24—24 in Figures 6 and 7, said offsets 24 forming ribs on one side and grooves on the opposite side of the respective plates so that, when the plates are assembled, as shown in Figures 2 and 3, said cooperating ribs and grooves will prevent relative vertical shifting between the stationary and movable plates. As shown in Figure 1, the rear ends of the movable friction plates E are normally engaged with the spring follower C.

The improved pressure-transmitting wedging device F consists of two like units oppositely arranged. Each of said units consists of a casting 25 of generally wedge form, as shown in Figures 1 and 5. Each said casting has a flat end face 26 adapted to extend transversely of the center line of draft, an inclined face 27 adapted to extend at an angle with respect to the center line of draft, and an outer face 28 adapted to extend parallel to the center line of draft. On the face or side 28, each element 25 is recessed as indicated at 29 in Figure 5 so as to form a pocket within which may be received a steel wear or bearing plate 30. The opposite edges of the recess 29 are additionally cut away to provide paired slots as indicated at 31—31 so as to accommodate anti-friction rollers 32—32. On its inclined face or side 27, each element 25 is recessed as indicated at 33, the same having a steel plate insert 34 therein. Said recess 33 is also provided with a pair of additional slots or notches 35 to accommodate another anti-friction roller 36. As will be understood by those skilled in the art, the effective depth of the recesses 29 and 33 after the respective inserts have been introduced, is less than the diameter of the respective anti-friction rollers so that the latter extend outwardly beyond the corresponding surfaces or faces of the wedge element and permit the anti-friction rollers to engage with an opposed member. Furthermore, the length of the notches or grooves 31 and 35 taken lengthwise of the respective faces of the wedge element is sufficiently greater than the diameters of the corresponding rollers to permit the latter a limited but free rolling movement.

From an inspection of Figure 1, it will be seen that the movable plates E are of graduated lengths so that the innermost ones of each set on each side of the center line have their front or outer ends nearer the follower 16 than has the central plate of each set and the central plate is nearer than the outermost plate of each set. The object of this arrangement of the movable plates is to provide for a graduated increase in the friction mechanism arising from the successive taking up or actuation of the movable plates E during the compression stroke. In operation during a compression stroke and assuming a buffing or inward movement of the drawbar, the follower 16 first forces the wedging device F rearwardly, thereby causing a slight expansion of the wedging device due to the relative longitudinal movement of one unit with respect to the other unit. This immediately increases the friction between the movable and stationary plates and, as soon as the wedging pressure has been initiated, the follower 16 will pick up the innermost pair of movable plates E and successively the other movable plates, thus increasing the friction, as will be understood. During release, it is evident that the wedging device F is free to move as a unit under the expanding pressure of the springs B because of the anti-friction engagement between said wedging device and the movable plates E. In addition there is a freedom of movement permitted between the two units of the wedging device whereby an immediate collapse or fall of the spreading or wedging pressure is obtained sufficient to easily permit the springs to force the wedging device and movable plates back to their normal fully released position.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a casing containing a plurality of relatively stationary friction plates; of a spring resistance; a main follower; a plurality of relatively movable friction plates alternated with said stationary plates, said movable plates having one set of ends located adjacent said follower, said ends being differently spaced from said follower whereby said movable plates are picked up and actuated progressively upon actuation of said follower, thereby gradually increasing the friction during the compression stroke; and wedge pressure-transmitting means cooperable between the plates to increase the lateral pressure therebetween upon actuation of the mechanism.

2. In a friction shock absorbing mechanism, the combination with a casing containing a plurality of relatively stationary friction plates; of a spring resistance, a spring follower; a main follower; a plurality of relatively movable progressively actuated friction plates alternated with said stationary plates and interposed lengthwise between said followers, said movable plates being of different lengths, the members of one set of ends of the movable plates being normally differently spaced from the adjacent main follower and the opposite set of ends being normally uniformly spaced from the other follower, whereby upon actuation of said follower, said movable plates are picked up and actuated progressively, by positive direct engagement of said follower with the ends of said movable plates; wedge-pressure-transmitting means cooperable between the plates to increase the lateral pressure therebetween upon actuation of the mechanism.

3. In a friction shock absorbing mechanism, the combination with a casing containing a plurality of relatively stationary friction plates, said plates being arranged in two groups on opposite sides of the center line; of a spring resistance; a main follower; a spring follower; a plurality of relatively movable friction plates alternated with said stationary plates and interposed lengthwise between said followers, said movable plates having one set of ends abutting the spring follower and the opposite ends located adjacent said main follower, said last named ends being differently spaced from said main follower whereby said movable plates are picked up and actuated progressively upon actuation of said follower, thereby gradually increasing the friction during the compression stroke; wedge pressure transmitting means interposed between the two groups of plates and between the followers, cooperable with the plates to increase the lateral pressure therebetween upon actuation of the mechanism; and anti-friction rollers interposed between said means and the friction plates.

4. As an article of manufacture, a wedge unit adapted for friction shock absorbing mechanisms, said unit comprising a casting of wedge structure having two sides thereof convergingly arranged, each of said sides having a recess formed therein, a hardened wear plate disposed at the bottom of each of said recesses, said casting having also pairs of alined grooves located on opposed sides of said recesses, said grooves being adapted to accommodate anti-friction rollers.

5. In a friction shock absorbing mechanism, the combination with a casing having a plurality of relatively stationary friction plates contained therein, said plates being arranged in two groups on opposite sides of the center line; of a spring resistance; a plurality of relatively movable friction plates alternated with said stationary plates, the lengths of said movable plates being different; an outer main follower adapted to engage adjacent ends of said movable plates successively, thereby gradually increasing the friction during the compression stroke; a follower interposed between the spring resistance and the other ends of said movable plates; and a wedging device interposed between the two sets of plates and between said two followers, said wedging device comprising two units having anti-friction means therebetween and anti-friction means between each unit and corresponding group of plates.

In witness that I claim the foregoing I have hereunto subscribed my name this 30th day of Dec. 1920.

JOHN F. O'CONNOR.

Witnesses:
 CARRY GAILING,
 UNA C. PERIN.